US005458036A

United States Patent [19]

Monaco

[11] Patent Number: 5,458,036

[45] Date of Patent: Oct. 17, 1995

[54] BOTTLENECK SLIDE BAR WITH SECTORS OF DIFFERENT MATERIALS

[76] Inventor: Wayne Monaco, 1669 W. 8th St., Brooklyn, N.Y. 11223

[21] Appl. No.: 279,218

[22] Filed: Jul. 22, 1994

[51] Int. Cl.[6] .................................................... G01D 3/00

[52] U.S. Cl. ........................ 84/319; 84/452 R; 84/452 P; D17/20

[58] Field of Search .............................. 84/315, 316, 317, 84/318, 319, 452 R, 452 P; D17/20

[56] References Cited

U.S. PATENT DOCUMENTS 2,490,517 12/1949 Garcia ...................................... 84/319

4,969,382 11/1990 Hein, III et al. ......................... 84/319

*Primary Examiner*—Steven L. Stephan
*Assistant Examiner*—Cassandra Spyrou
*Attorney, Agent, or Firm*—Charles E. Baxley

[57] ABSTRACT

A slide bar for use with stringed instruments, such as the guitar or the dobro, includes two longitudinal halves with each half having a semi-cylindrical configuration. The two halves are made of different materials and are joined to form a hollow cylinder or tube. In an alternative embodiment of the invention, three members each made of different materials are joined to form a hollow cylinder.

27 Claims, 2 Drawing Sheets

BOTTLENECK SLIDE BAR WITH SECTORS OF DIFFERENT MATERIALS

BACKGROUND OF THE INVENTION

The present invention relates generally to the field of musical instruments and, more particularly, to a bottleneck slide with chords of different materials for use with stringed instruments.

The prior art related to slides for use with stringed instruments, such as the guitar and the dobro, includes the use of the neck of a bottle placed over one finger of the left or right hand which would then be slid over the frets while playing to produce an effect which simulates a Hawaiian guitar.

Modern slides are typically configured as tubes which can be worn on any finger and which are typically made of glass or metal such as brass or chromium steel.

OBJECTS AND SUMMARY OF THE INVENTION

It is an object of the present invention to provide a bottleneck slide which incorporates materials of different acoustic qualities in order to achieve unique musical effects.

Another object of the present invention is to provide a bottleneck slide which can be used to achieve the musical effect of two different acoustic materials simultaneously.

Another object of the present invention is to provide a bottleneck slide which incorporates three different materials.

Another object of the present invention is to provide a bottleneck slide which incorporates different acoustic materials and a beveled operating surface.

Yet another object of the present invention is to provide a bottleneck slide which can be manufactured economically in quantity, resulting in a relatively low unit cost.

The foregoing and other objects and advantages of the present invention will appear more fully hereinafter.

In accordance with the present invention, there is provided a bottleneck slide in the form of a generally cylindrical tube made from sectors or chords of different materials. The term "sector" is defined as "the portion of a circle bounded by two radii and the arc intersected therebetween" for geometrical terminology as used in this Application. The slide has a length which is in the order of approximately two and one-quarter inches (2¼") with an inner diameter in the order of three-quarters of an inch (¾"), although the slide will come in a variety of lengths and diameters.

In the first four embodiments of the invention, the slide is composed of two sectors or chords that are longitudinal halves with each half having a semi-cylindrical configuration. The two halves are each made of a different material from the other and are joined to form a hollow cylinder or tube. Appropriate material combinations have been found to be one-half brass in combination with one-half glass; one-half brass in combination with one-half other metal such as chromium steel; one-half glass in combination with one-half metal; one-half plastic in combination with one-half brass or one-half glass or one-half metal.

In a fifth embodiment of the present invention, the slide is formed as a cylindrical tube which is made of a plastic such as PVC Schedule No. 40.

In a sixth embodiment of the present invention, the slide is composed of three sector portions which are joined along seams to form a hollow cylinder. The first sector portion is formed as one-half of a cylinder and the second and third sector portions are each formed as one-quarter of a cylinder. The first sector portion and the second and third sector portions may be made of brass, glass, metal or plastic and the combination of the different materials provides new and unusual musical effects.

In a seventh embodiment of the present invention, the slide is made of a one-half brass sector and a one-half steel sector, as described above with the outer surface of the slide beveled in order to produce a unique sound.

BRIEF DESCRIPTION OF THE DRAWINGS

Other important objects and advantages of the present invention will be apparent from the following detailed description taken in conjunction with accompanying drawings in which.

DETAILED DESCRIPTION OF THE INVENTION

Figure 1:
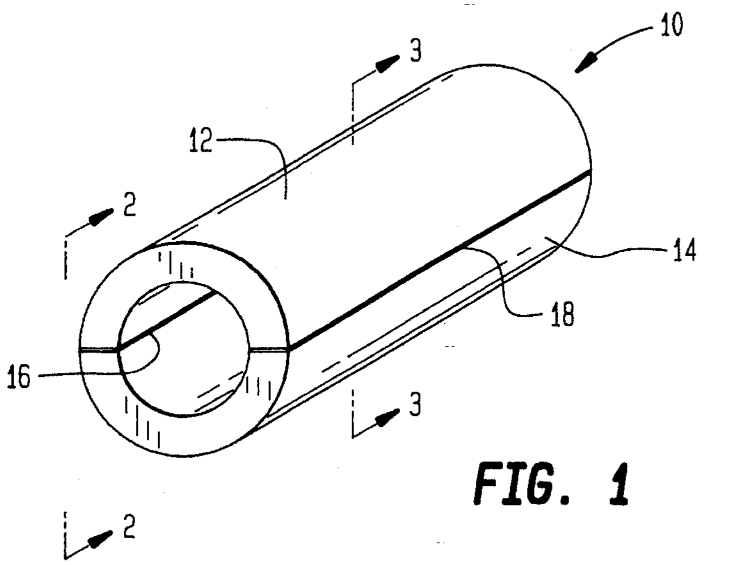
FIG. 1 is a perspective view of a generally cylindrical bottleneck slide with sector or chord portions of different materials made in accordance with the present invention.

With reference to the drawings, there is shown in FIG. 1 the first embodiment of a generally cylindrical bottleneck slide 10 with sectors or chords of different materials made in accordance with the present invention which includes a pair of chords 12, 14 each of which has a semi-cylindrical configuration and which are fastened together to form a hollow cylinder. The chords 12, 14 each have an arc of 180° or fifty percent (50%) of a circle and, are fastened together by adhesive layers 16, 18 to define a circular cross section and circular ends. In addition to adhesive, fastening can be achieved by other methods of bonding, such as set screws, clamps, fusion or any other appropriate means.

The cylinder has a preferred length which is in the order of two and one-quarter inches and an inner diameter which is in the order of three-quarters of an inch.

Figure 2:
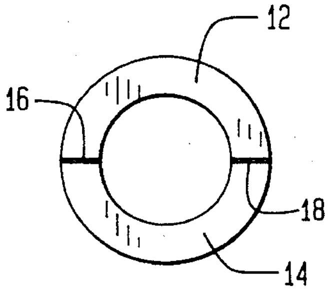
FIG. 2 is an end view of the slide of FIG. 1, taken along line 2—2 of FIG. 1.
Figure 3:
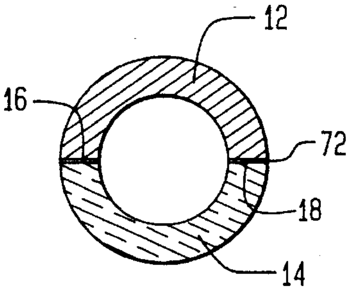
FIG. 3 is a cross-sectional view taken along line 3—3 of FIG. 1.

In the first embodiment of the present invention, which is shown in FIGS. 1–3, the sector or chord 12 is made of brass and the sector or chord 14 is made of glass.

Figure 4:
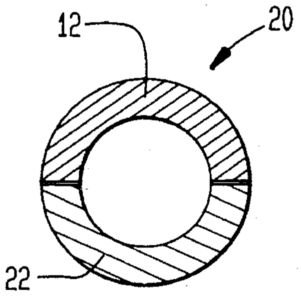
FIG. 4 is a cross-sectional view similar to FIG. 3, showing a second embodiment of the invention.

In the second embodiment of the invention 20, which is shown in FIG. 4, the sector or chord 22 is made of another metal such as chromium steel.

Figure 5:
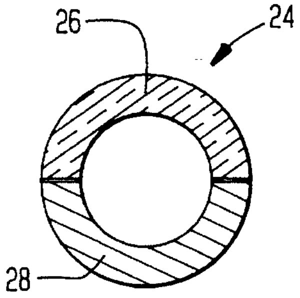
FIG. 5 is a cross-sectional view similar to FIG. 3, showing a third embodiment of the invention.

In the third embodiment of the present invention 24, which is shown in FIG. 5, the sector or chord 26 is made of glass and the sector or chord 28 is made of metal.

Figure 6:
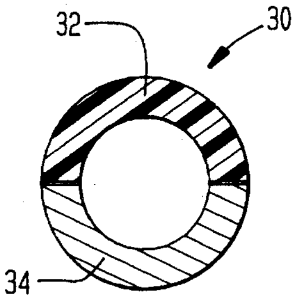
FIG. 6 is a cross-sectional view similar to FIG. 3, showing a fourth embodiment of the invention.

In the fourth embodiment of the present invention 30, which is shown in FIG. 6, the sector or chord 32 is made of plastic and the sector or chord 34 is made of brass, glass or a metal other than brass.

Figure 7:
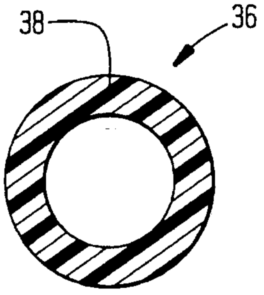
FIG. 7 is a cross-sectional view similar to FIG. 3, showing a fifth embodiment of the invention which is a unitary tubular member which utilizes a PVC plastic material.

In the fifth embodiment of the invention 36, shown in FIG. 7, the slide is formed as a unitary member 38 which is made of a plastic material, preferably PVC Schedule 40 or 80.

Figure 8:
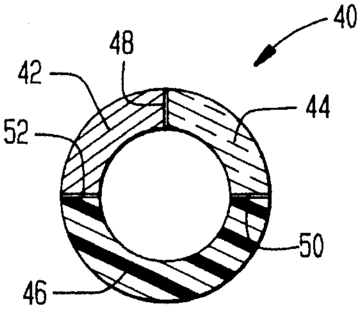
FIG. 8 is a cross-sectional view similar to FIG. 3, showing a sixth embodiment of the invention which incorporates three sector segments.

In the sixth embodiment of the present invention 40, shown in FIG. 8, the slide is formed of three sector or chord portions 42, 44, 46 which are joined to form a hollow cylinder by adhesive layers 48, 50, 52.

The sector 46 is formed as approximately one-half (50%) of a circle (in cross section), and the sector chords 42, 44 are each formed as approximately one-quarter of a circle (in cross section). The sector or chords 42, 44, 46 may each be made (25%) of a different material such as brass, glass, metal or plastic, preferably PVC Schedule 40 or 80, and the combination of the different materials provides a unique musical sound.

Figure 9:
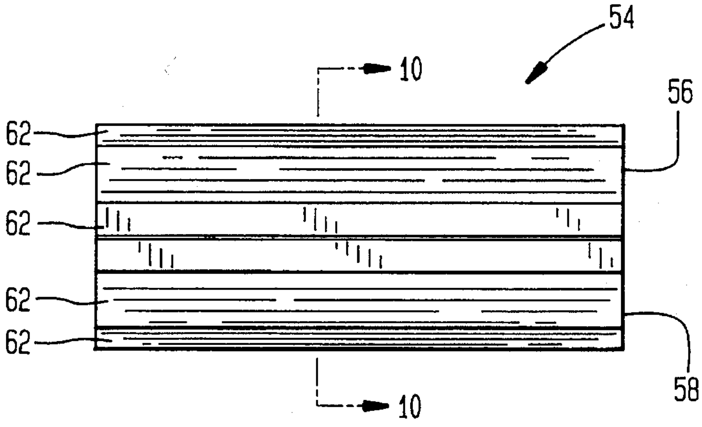
FIG. 9 is an elevational view of a seventh embodiment of the invention.
Figure 10:
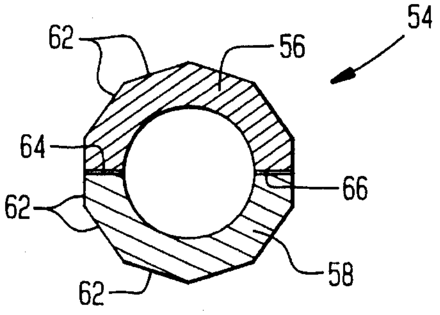
FIG. 10 is a cross-sectional view taken along line 10—10 of FIG. 9.

In the seventh embodiment of the present invention 54, which is shown in FIGS. 9 and 10, the slide is made of two sectors or chords 56, 58 with the chord 56 preferably made of a metal such as chromium steel and the sector or chord 58 preferably made of brass. The sectors or chords 56, 58 are joined by the adhesive layers 64, 66. In this embodiment 54, the outer surface 60 of the slide incorporates a plurality of beveled portions 62. The term "secant" is defined as "a straight line cutting a curve at two points" for geometrical terminology as used in this Application. The beveled portions 62 are highly polished resulting in an extremely smooth surface. The surface 60 allows the flat portions of the bevels 62 to be applied to the strings of the musical instrument thereby producing a distinctive musical sound. The sound produced can be characterized as being gritty with long sustaining power.

Figure 11:
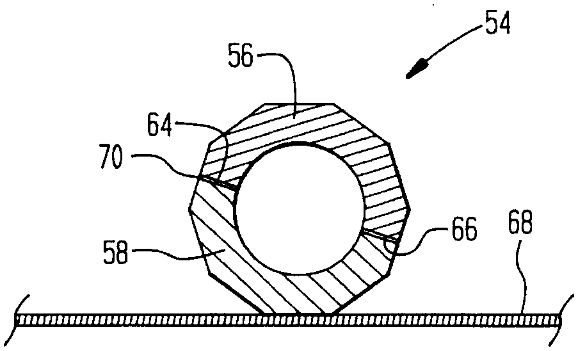
FIG. 11 is a schematic view of a slide being applied to a string of a musical instrument.

During use, the portion 58 of the slide 54 can be applied to the strings 68, as shown typically in FIG. 11, to achieve a sound which is characteristic of brass and similarly the slide can be turned so that the portion 56 of the slide 54 can be applied to the strings to achieve a sound which is characteristic of steel. In addition, the portion 70 of the slide 54 can be applied to the strings 68 to achieve a third sound which results from the combined effects of the brass and metal portions 56, 58.

The various sounds which can be produced by the slides, according to the present invention, include a loose metallic sound when a brass portion 18 is applied to the strings of a guitar or a dobro, a softer mellow sound when a glass portion 14 is applied to the strings, a hard metallic sound when a metal portion 22 is applied to the strings and a cross between the glass and chrome sound when a PVC portion 32 is applied to the strings.

In addition, a unique sound which combines the attributes of the various portions can be achieved when the interface between two adjacent portions is applied to the strings such as when the interface 72 between the glass and the brass portions, shown in FIG. 3, is applied to the strings.

The slides, according to the present invention, can be easily rotated on the fingers of the musician to achieve the various musical effects described above and the slides, which combine the various chord portions, enable a single slide to achieve a broad range of musical effects.

The foregoing specific embodiments of the present invention, as set forth in the specification, are for illustrative purposes only. Various changes and modifications may be made within the spirit and scope of this invention.

I claim:

1. A bottleneck slide with chords of different materials comprising:

a first chord member, a second chord member, a third chord member, and first joining means, with said first joining means disposed joining said first chord member to said second chord member, second joining means with said second joining means joining said second chord member to said third chord member, and third joining means with said third joining means joining said third chord member to said first chord member thereby forming a hollow cylindrical member, with said first chord member, said second chord member and said third chord member each made of a different material.

2. A bottleneck slide with chords of different materials according to claim 1, in which said first chord member is made of plastic, said second chord member is made of brass and said third chord member is made of metal.

3. A bottleneck slide with chords of different materials according to claim 1, in which said first chord member is made of plastic, said second chord member is made of glass and said third chord member is made of metal.

4. A bottleneck slide with chords of different materials according to claim 1, in which said first chord member is made of plastic, said second chord member is made of glass and said third chord member is made of brass.

5. A bottleneck slide with chords of different materials according to claim 1, in which said first chord member is made of brass, said second chord member is made of plastic and said third chord member is made of metal.

6. A bottleneck slide with chords of different materials according to claim 1, in which said first chord member is made of brass, said second chord member is made of glass and said third chord member is made of metal.

7. A bottleneck slide with chords of different materials according to claim 1, in which said first chord member is made of brass, said second chord member is made of glass and said third chord member is made of plastic.

8. A bottleneck slide with chords of different materials according to claim 1, in which said first chord member is made of glass, said second chord member is made of plastic and said third chord member is made of metal.

9. A bottleneck slide with chords of different materials according to claim 1, in which said first chord member is made of glass, said second chord member is made of brass and said third chord member is made of metal.

10. A bottleneck slide with chords of different materials according to claim 1, in which said first chord member is made of glass, said second chord member is made of brass and said third chord member is made of plastic.

11. A bottleneck slide with chords of different materials according to claim 1, in which said first chord member is made of metal, said second chord member is made of brass and said third chord member is made of plastic.

12. A bottleneck slide with chords of different materials according to claim 1, in which said first chord member is made of metal, said second chord member is made of brass and said third chord member is made of glass.

13. A bottleneck slide with chords of different materials according to claim 1, in which said first chord member is made of metal, said second chord member is made of glass and said third chord member is made of plastic.

14. A bottleneck slide with chords of different materials according to claim 1, with said first chord member comprising approximately fifty percent (50%) of a circle, and said second chord and said third chord members each comprising approximately twenty five percent (25%) of a circle.

15. A bottleneck slide with chords of different materials according to claim 3, in which said metal comprises chromium steel.

16. A bottleneck slide bar comprising:

a tubular member including a generally cylindrical wall defining a circle in cross section, the circle including at least two sectors each made of a different material from the other, joining means for joining the two sectors together to form the circle.

17. The slide bar as claimed in claim 16 wherein the joining means comprises an adhesive layer.

18. The slide bar as claimed in claim 17 wherein the sectors include a first glass sector and a second metal sector.

19. The slide bar as claimed in claim 17 wherein the sectors include a first glass sector and a second brass sector.

20. The slide bar as claimed in claim 17 wherein the sectors include a first brass sector and a second sector made of a metal composition other than brass.

21. The slide bar as claimed in claim 17 wherein the sectors include a first plastic sector and a second metal sector.

22. The slide bar as claimed in claim 17 wherein the sectors include a first sector made of a plastic material and a second metal sector.

23. The slide bar as claimed in claim 17 wherein the sectors include a first sector made of a plastic material and a second brass sector.

24. The slide bar as claimed in claim 17 wherein the sectors include a first sector made of a plastic material and a second sector made of a metal alloy other than brass.

25. The slide bar as claimed in claim 21, 22, 23 or 24, wherein the plastic material is selected from a group consisting of polyvinyl chloride 40 and polyvinyl chloride 80.

26. The slide bar as claimed in claim 16 with the wall having an outer surface provided with at least one flat beveled secant of the circle.

27. The slide bar as claimed in claim 17 with the wall having an outer surface provided with at least one flat beveled secant of the circle, the beveled secant overlapping both of the sectors.

* * * * *